(12) United States Patent
Kubby et al.

(10) Patent No.: US 7,016,587 B2
(45) Date of Patent: Mar. 21, 2006

(54) LOW LOSS SILICON WAVEGUIDE AND METHOD OF FABRICATION THEREOF

(75) Inventors: Joel A. Kubby, Rochester, NY (US); Yao Rong Wang, Webster, NY (US)

(73) Assignee: Xerox Corporation, Stamford, CT (US)

(*) Notice: Subject to any disclaimer, the term of this patent is extended or adjusted under 35 U.S.C. 154(b) by 198 days.

(21) Appl. No.: 10/760,846

(22) Filed: Jan. 20, 2004

(65) Prior Publication Data

US 2005/0158002 A1   Jul. 21, 2005

(51) Int. Cl.
    *G02B 6/10*   (2006.01)
(52) U.S. Cl. .................. 385/129; 385/14; 385/130; 385/131; 385/132; 438/41
(58) Field of Classification Search .......... 385/14, 385/129–132, 144; 216/2; 438/22, 31, 41
See application file for complete search history.

(56) References Cited

U.S. PATENT DOCUMENTS

| 5,841,931 | A | * | 11/1998 | Foresi et al. ............ 385/131 |
|---|---|---|---|---|
| 5,882,532 | A | | 3/1999 | Field et al. ............... 216/2 |
| 6,063,299 | A | | 5/2000 | Drake et al. .............. 216/24 |
| 6,470,130 | B1 | * | 10/2002 | Walker et al. ............ 385/142 |
| 6,510,275 | B1 | | 1/2003 | Tran et al. ............... 385/139 |
| 6,674,950 | B1 | * | 1/2004 | Yang et al. ............... 385/129 |
| 6,790,689 | B1 | * | 9/2004 | Behfar ..................... 438/22 |
| 2001/0024559 | A1 | * | 9/2001 | Kling ....................... 385/132 |
| 2004/0008968 | A1 | * | 1/2004 | Lee et al. ................. 385/142 |
| 2005/0152658 | A1 | * | 7/2005 | Keyser ..................... 385/129 |

* cited by examiner

*Primary Examiner*—Akm Enayet Ullah
*Assistant Examiner*—Daniel Petkovsek
(74) *Attorney, Agent, or Firm*—Robert A. Chittum

(57) ABSTRACT

A silicon rib waveguide that has a silicon nitride cladding layer of predetermined thickness to reduce optical loss of light propagating therethrough. An exemplary embodiment of the waveguide is fabricated by using a silicon-on-insulator structure having a single crystal silicon layer bonded to a silicon wafer with a layer of insulative material. An etch resistant masking layer is deposited on the outer surface of the single crystal silicon layer and patterned to produce vias therein. A RIE etching process is used through the vias in the masking layer to form at least one rib bounded by a pair of parallel trenches. The masking layer is removed and a silicon nitride cladding layer is deposited on the rib side and end walls and on the trenches.

10 Claims, 4 Drawing Sheets

LOW LOSS SILICON WAVEGUIDE AND METHOD OF FABRICATION THEREOF

BACKGROUND OF THE INVENTION

An exemplary embodiment of this application relates to an improved silicon waveguide for a micro-optical system. More particularly, the exemplary embodiment relates to a silicon rib waveguide having a cladding layer that reduces optical loss due to scattering from waveguide side wall roughness.

In integrated silicon photonic light circuits or micro-optical systems, a silicon waveguide structure is incorporated therein that typically comprises a rib formed in the upper single crystal silicon layer of a silicon-on-insulator chip or wafer. Light signals may be introduced into and out of the rib waveguide by coupling optical fibers thereto. The rib has a top surface and opposing parallel side walls, and a parallel trench adjacent each of the rib side walls. The rib serves to confine an optical light signal transmitted thereto, and the light signal is contained in the rib and under the trenches as it is transmitted therethrough.

One well known and effective process for producing the rib and trenches in the single crystal silicon layer is reactive ion etching (RIE). However, the RIE etch results in rib side wall roughness on the order of 1–500 nm that cause scattering of light propagating along the waveguide. This light scattering produces an optical loss measured to be approximately 1.7 dB/cm. It is highly desirable to minimize the optical insertion loss in such silicon rib waveguides.

U.S. Pat. No. 6,063,299 discloses the manufacture of a silicon rib waveguide from a silicon-on-insulator chip. This form of waveguide provides a single mode, low loss waveguide having dimensions in the order of 3 to 5 $\mu$m which can be coupled to optical fibers. The top surface of the rib waveguide is covered by a nitride buffer layer and the side walls and adjacent trough areas are clad with a thermal oxide or silicon dioxide. A light absorbing material, such as, a metallic layer may be deposited on the nitride buffer layer on the top of the rib waveguide to produce a polarizer. The use of the silicon dioxide cladding on the side walls of the waveguide reduces the index of refraction contrast from the silicon waveguide to the surrounding air by including the silicon dioxide cladding material of intermediate index. Thus, as indicated in this patent, the silicon dioxide cladding can reduce the insertion loss by 0.2 dB/cm. Although this reduction in optical loss is significant, it is the aim of the exemplary embodiment of this application to provide an even greater loss reduction. Further, while the silicon dioxide cladding layer offers improvement in optical loss for silicon rib waveguides, an oxide cladding layer will not work for micro-optical systems as a final step in the fabrication process. This is because a sacrificial layer is generally used that must be etched by hydrofluoric acid (HF) to release switches. In addition, the growth of a thermal oxide results in significant thin film stress that impacts polarization mode dispersion, as discussed in more detail later.

U.S. Pat. No. 6,510,275 discloses a micro-optoelectromechanical device with aligned structures having at least one rib waveguide formed in an upper silicon layer of the device and at least one optical fiber connection structure in the form of a V groove that is formed in the lower silicon substrate of the device. In one embodiment, the upper silicon layer is a single crystal silicon layer of a silicon-on-insulator wafer. A method of fabricating the device provides that the waveguide and V groove is defined by the same masking layer. The V groove is thus self aligned with the waveguide. When an optical fiber is fixed in the V groove, the misalignment of the coupled optical fiber and waveguide is minimized. The facet/side surface of the waveguide is left covered with a silicon nitride masking layer to serve as an anti-reflection coating, while the side walls of the rib waveguide is left bare.

U.S. Pat. No. 5,882,532 discloses a method for fabricating thin micromechanical devices in a way that is compatible with silicon wafer handling and processing for conventionally thick wafers. The method includes a fabrication wafer of single crystal silicon bonded to a handle wafer of conventional thickness to form a bonded wafer pair. The thickness of the single crystal silicon wafer may be reduced by typical micromachining and polishing processes. The fabrication wafer is etched to form a trench surrounding each of the micromechanical devices to separate them from the rest of the fabrication wafer, except for at least one tether that keeps the micromechanical devices attached to the fabrication wafer. The bonding layer is etched away to release the etched fabrication wafer from the handle wafer. The individual micromechanical devices are obtained by breaking the tethers.

Planar light circuits use photonic signals that propagate through optical waveguides in contrast to the electrical signals that propagate through wires in microelectronic integrated circuits. It is anticipated that miniature waveguides in planar light circuits of micro-optical systems will be an enabling technology to decrease the cost of optical telecommunication components through batch manufacturing and integration of functions on-chip. Accordingly, further reduction in optical loss of light propagating through silicon rib waveguides as delineated by the exemplary embodiment of this application is considered an important advance in this technology.

SUMMARY OF THE INVENTION

It is an object of an exemplary embodiment of this application to provide a low loss silicon rib waveguide for a micro-optical system having a silicon nitride cladding layer for the reduction of optical loss due to scattering from side wall roughness.

It another object of the exemplary embodiment to provide a low loss silicon rib waveguide having a silicon nitride cladding to protect the waveguide from damage and contaminants during fabrication thereof.

It is still another object of the exemplary embodiment to provide a low loss silicon rib waveguide having a low stress silicon nitride cladding to minimize strain on the waveguide and prevent polarization mode dispersion.

It is yet another object of the exemplary embodiment to provide a low loss silicon rib waveguide having a silicon nitride layer of a specific thickness for both the reduction of optical loss due to scattering from side wall roughness and to form an anti-reflection coating at waveguide facets to reduce the loss from Fresnell reflections.

In one aspect of the exemplary embodiment, there is provided a method of fabricating a silicon rib waveguide for a micro-optomechanical device, comprising: providing a silicon-on-insulator structure having a single crystal silicon wafer with a surface thereof being bonded to a surface of a silicon wafer with an insulative bonding material; patterning a surface of the single crystal silicon wafer opposite said surface bonded to the surface of the silicon wafer to form at least one silicon rib between parallel trenches; the at least one silicon rib having opposing substantially parallel side walls and a top surface, each of said side walls of the silicon rib being a respective one of the walls of the trenches; and forming a silicon a silicon nitride cladding layer on the side walls and top surface of the at least one silicon rib and the trenches, said silicon nitride cladding layer having a predetermined thickness.

BRIEF DESCRIPTION OF THE DRAWINGS

An exemplary embodiment of this application will now be described, by way of example, with reference to the accompanying drawings, in which like reference numerals refer to like elements, and in which.

DESCRIPTION OF THE PREFERRED EMBODIMENT

Figure 1:
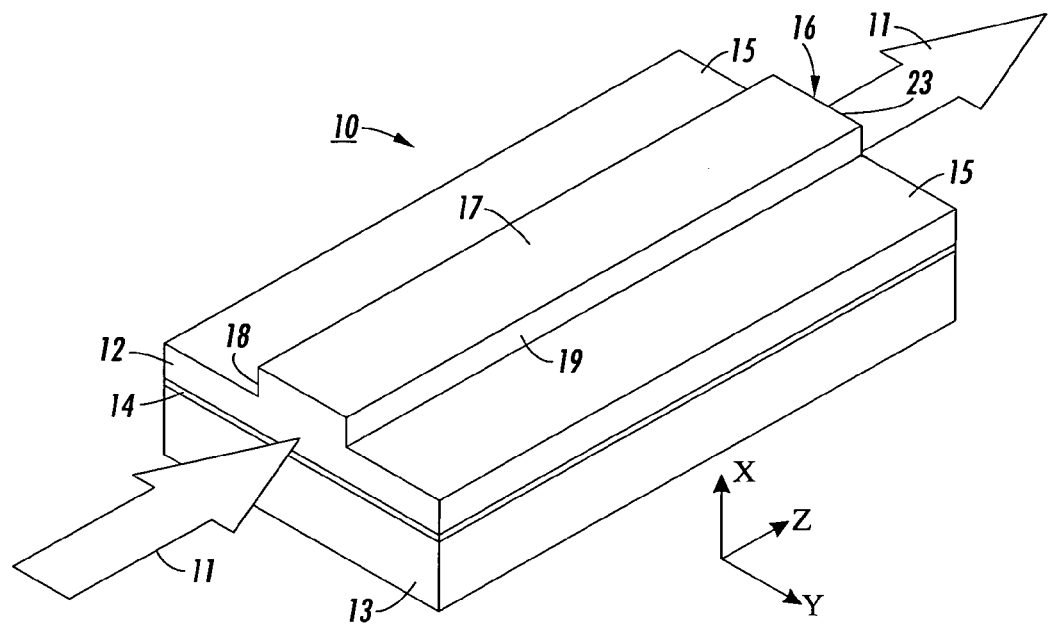
FIG. 1 is a schematic isometric view of a typical prior art silicon rib waveguide.

In FIG. 1, an isometric view of a typical prior art silicon rib waveguide 10 is shown having a coordinate system with axes denoted by x, y, and z. The longitudinal z-axis indicates the direction of light propagation, indicated by the large arrows 11, and the transverse y-direction and x-direction will be referred to as horizontal and vertical direction, respectively. The polarization mode of the propagated light is defined by the magnitude of its transverse electric (E) and transverse magnetic (M) components. If the polarization mode has dominate $E_y$ and $M_x$ components and minor $E_x$ and $M_y$ fields, the light is called transverse electric (TE) polarized. If the polarization mode has dominate $E_x$ and $M_y$ fields and minor $E_y$ and $M_x$ components, the light is called transverse magnetic (TM) mode.

The waveguide 10 generally consists of an upper silicon substrate 12, usually a single crystal silicon, bonded to a lower usually thicker silicon substrate 13 with a layer of insulative material 14. The bonded substrates 12,13 and insulative layer 14 is referred to as a silicon-on-insulator chip or wafer. The lower silicon substrate 13 provides the added mechanical strength necessary for increasing yield during fabrication of the rib waveguide, and after the rib waveguide is formed, it may be optionally released from the lower substrate by removing the bonding layer 14. The rib waveguide 10 is generally fabricated by reactive ion etching (RIE) a pair of parallel trenches 15 in the upper silicon substrate that are spaced apart to form a rib 16. The rib 16 has a top surface 17 and opposing side walls 18, 19. The light that is transmitted through the waveguide 10 is contained in the rib 16 and under a portion of the trenches 15.

Figure 2:
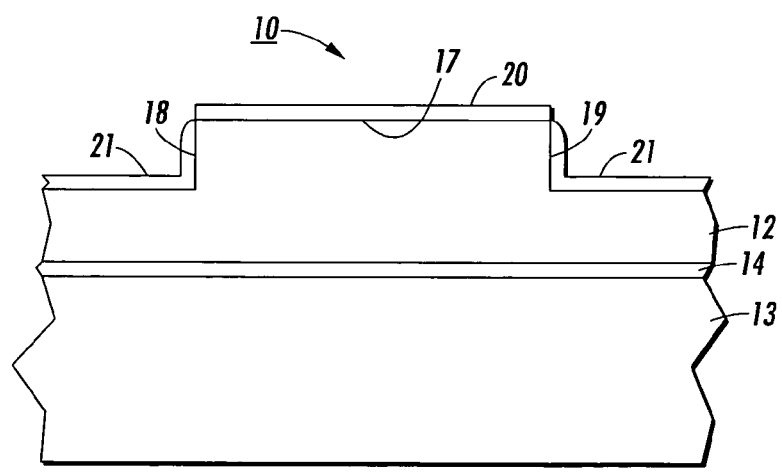
FIG. 2 is a cross-sectional view of the silicon rib waveguide shown in FIG. 1.

In FIG. 2, an enlarged, cross-sectional view of the prior art rib waveguide 10 of FIG. 1 is depicted. As disclosed in U.S. Pat. No. 6,063,299 mentioned above, the top surface 17 of the rib 16 has a nitride buffer layer 20 and the side walls 18,19 of the rib have a silicon dioxide cladding layer 21.

Figure 3:
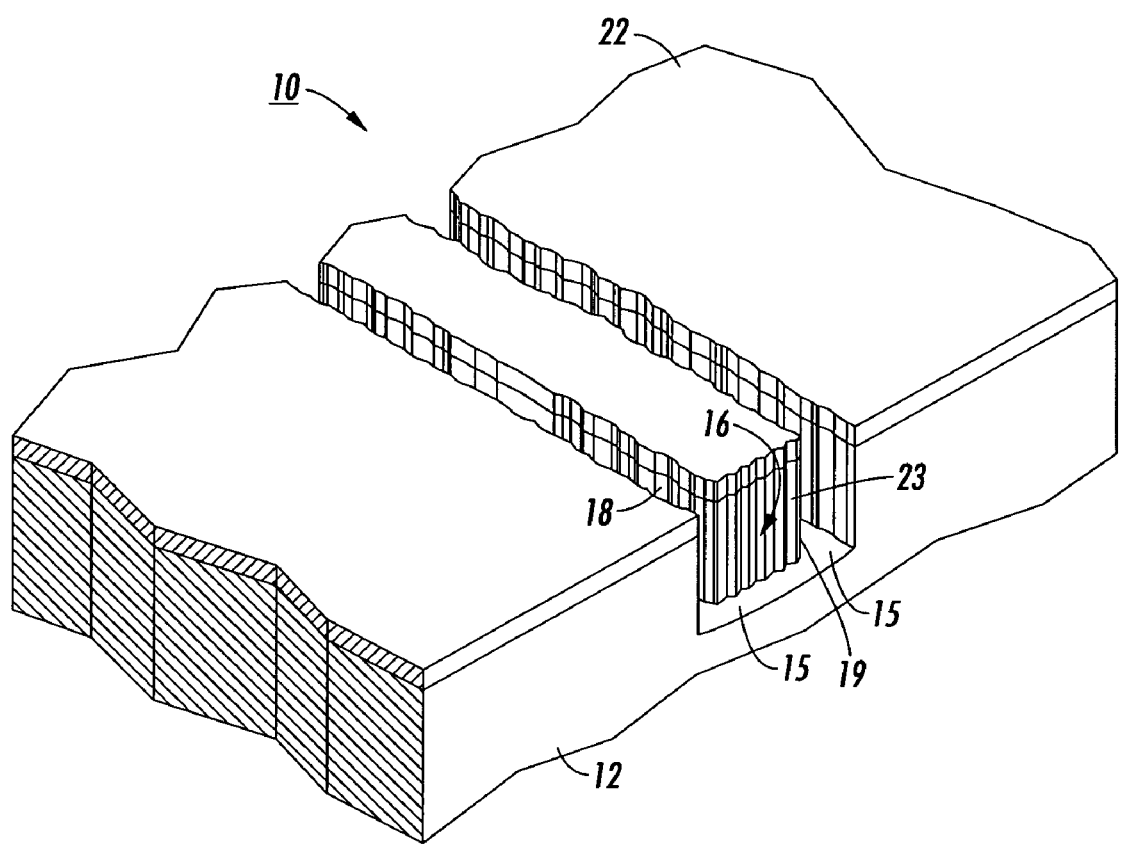
FIG. 3 is a partial isometric view of a silicon rib waveguide formed by a RIE process and showing the side wall roughness resulting therefrom.

A partially shown isometric view of a silicon rib waveguide 10 that has been formed by a RIE etching process is shown in FIG. 3. In this view, the surface roughness of the side walls 18, 19 and end wall 23 of the rib waveguide is clearly shown. The typical roughness of the peaks and valleys produce on the side walls by the RIE etching process is on the order of 1–500 nm, and, unless reduced by further processing, results in an optical loss of approximately 1.7 dB/cm for light propagating in the rib waveguide. In this FIG. 3, a patterned masking layer 22 is shown that enabled the delineation the two parallel trenches 15 by a RIE process, and the spacing between the two trenches defines the rib 16 in the single crystal silicon layer 12.

Figure 4:
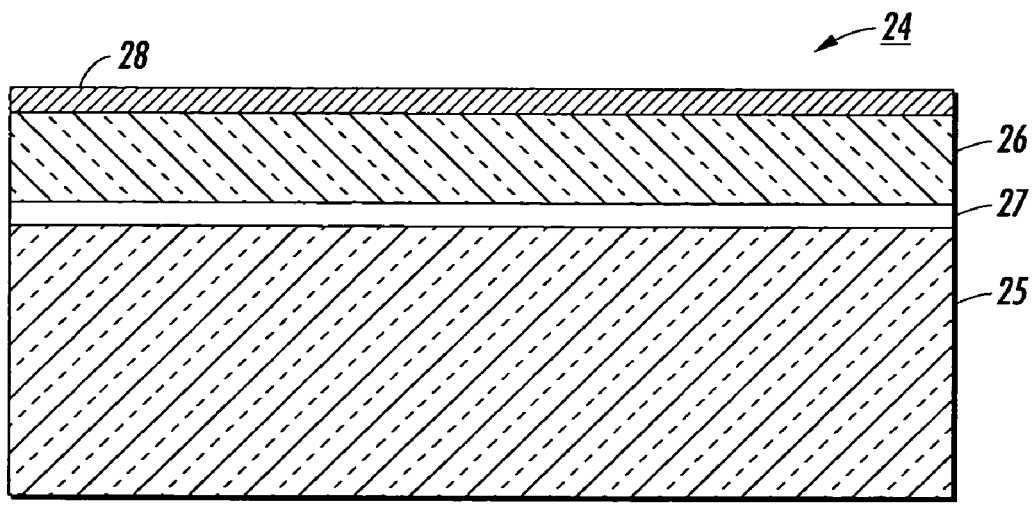
FIGS. 4–7 are cross-sectional views illustrating a method of fabricating an exemplary embodiment of a silicon rib waveguide according to this application.

Although a plurality of silicon rib waveguides is generally produced from a silicon-on-insulator wafer, only one waveguide will be used in the following description for clarity. FIGS. 4–7 illustrate in schematic cross-section, the various steps of an exemplary embodiment of a method of fabricating a silicon rib waveguide 30 according to this application. As shown in FIG. 4, the process of the exemplary embodiment of silicon rib waveguide 30 (see FIG. 7) begins with a silicon-on-insulator wafer or chip 24. The silicon-on-insulator wafer 24 comprises a silicon substrate or wafer 25, a single crystal silicon layer or wafer 26 and an insulator bonding layer 27 therebetween. A silicon nitride layer ($Si_3N_4$) 28 is deposited on the surface of the single crystal silicon layer 26 that is opposite the surface contacting the bonding layer 27. The silicon nitride layer 28 has a thickness of 0.1 to 1.5 $\mu$m and preferably about 0.5 $\mu$m. Any suitable process may be used to form the silicon nitride layer 28, such as, for example, by using a low-pressure chemical vapor deposition (LPCVD) process.

The silicon wafer 25 may be any commercially available silicon wafer or portion thereof, and is generally about 500 $\mu$m thick. The single crystal silicon wafer 26 may have the desired thickness of 20 to 100 $\mu$m before being bonded to the silicon wafer 25 or it may be much thicker initially and micromachined and polished by means well known in the industry to reduce its thickness to the desired dimension after being bonded to the silicon wafer 25. In many micro-optical systems, the silicon wafer 25 is used only to provide mechanical strength to prevent damage to the single crystal silicon layer during fabrication steps. When the silicon rib waveguide 30 (see FIG. 7) is completed, the silicon wafer 25 may be optionally released from the one or more silicon rib waveguides by removing the bonding layer 27. Any suitable insulative material may be used for the bonding layer 27, such as, for example, phosphosilicate glass and thermal oxide ($SiO_2$). The thickness of the bonding layer 27 is in the range of 1–20 $\mu$m, but is about 1.0 $\mu$m in the exemplary embodiment of this application.

Figure 5:
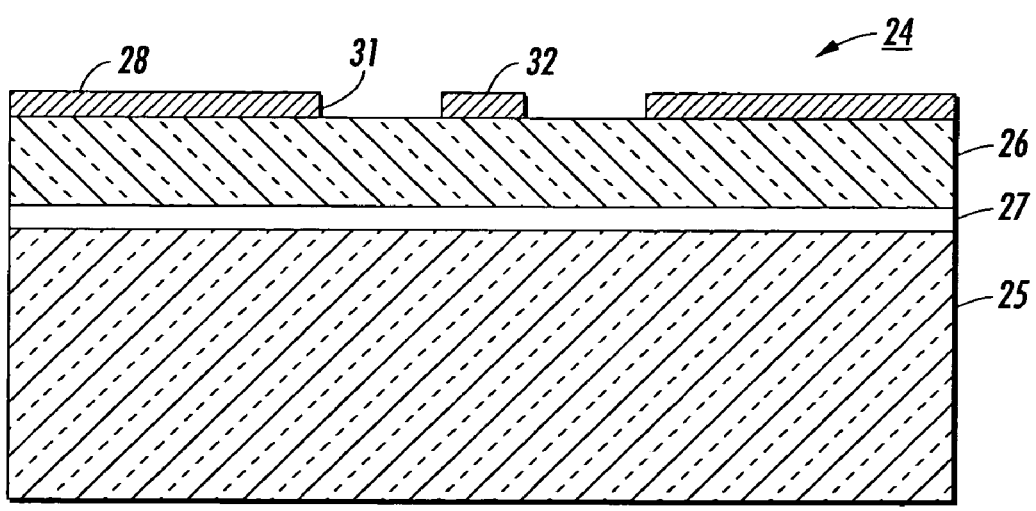
Figure 6:
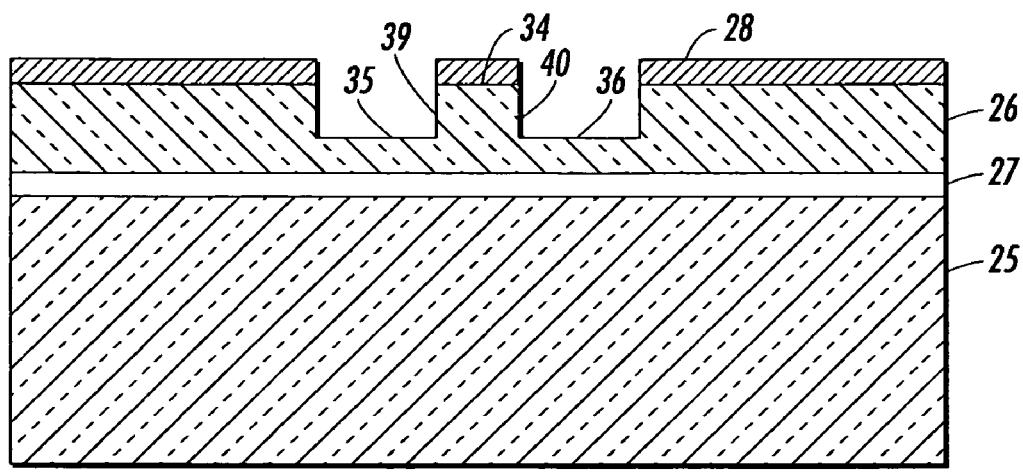

As shown in FIGS. 5 and 6, the silicon nitride layer 28 is patterned to form a masking layer that delineates the two vias 31, 32 for subsequent use in forming the silicon rib 34 between the two parallel trenches 35, 36. Any suitable patterning process may be used to pattern the silicon nitride layer, such as, for example, a photolithographic process (not shown) in which a photoresist is deposited and patterned followed by a wet or dry etching to remove the exposed silicon nitride layer. After the silicon layer is patterned, the photoresist is removed.

Any suitable etching process may be used to form the two trenches 35, 36 and concomitantly the silicon rib 34. However, the preferred etching process is a $SF_6$ based deep reactive ion etch (RIE). As shown in FIG. 6, the deep RIE etch results in the trenches 35, 36 having a depth of about 2 $\mu$m and the silicon rib side walls 39, 40 and end walls (not shown) having about the same height. The opposing end walls that will serve as facets for incoming and outgoing light that will propagate through the rib waveguide are not shown in FIG. 6. However, the end walls of the waveguide will be similar to the end wall 23 shown in FIG. 3. The silicon rib waveguide side walls and end walls produced by the RIE etching process have a roughness of between 1 to 500 nm. This roughness causes scattering of light propagating through the rib waveguide that leads to an optical loss. This optical loss has been measured to be approximately 1.7 dB/cm. After the trenches and silicon rib are etched, the silicon nitride layer 28 is removed.

Figure 7:
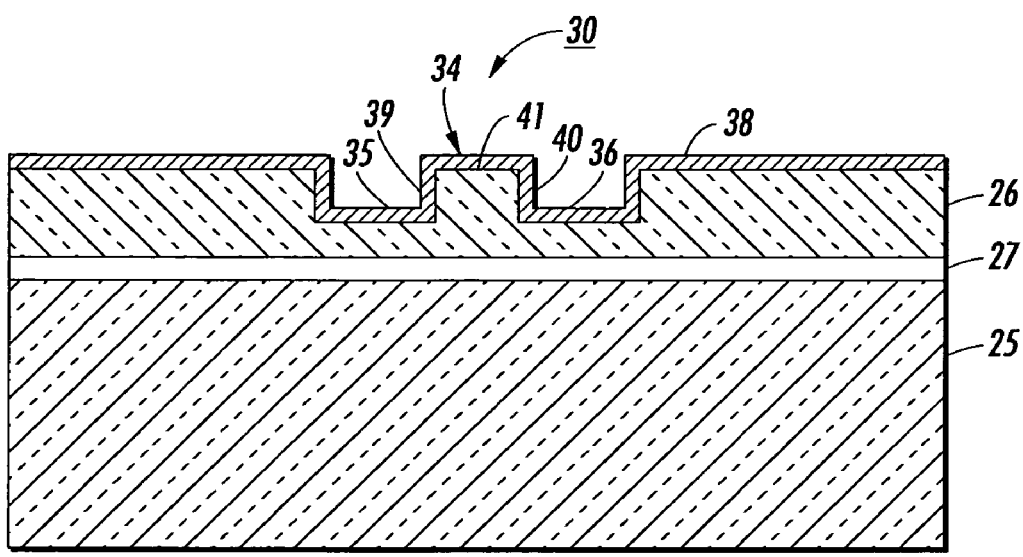

As shown in FIG. 7, a second silicon nitride layer 38 is deposited on the patterned surface of the single crystal silicon layer 26, including the trenches 35, 36 and silicon rib 34 therebetween. The silicon nitride layer 38 may be deposited by any known method, but preferably by a LPCVD process. Thus, the silicon rib side walls 39, 40 and top surface 41 thereof are clad with the second silicon nitride layer 38. The second silicon nitride layer 38 has a predetermined thickness based upon the light wave length ($\lambda$) of the propagating light and the index of refraction (n) of the cladding material, as discussed later.

Silicon nitride has an index of refraction n=approximately 2, while the index of refraction of silicon is n=approximately 3.5 and the index of refraction of air is n=approximately 1. It has been shown by modeling that the use of silicon nitride cladding on the silicon rib side walls reduces the optical loss by 0.35 dB/cm. A silicon dioxide cladding of the silicon rib, as disclosed in the prior art, has an index of refraction n=1.5, and results in only a 0.2 dB/cm reduction in the optical loss. Thus, the exemplary embodiment of this application provides a significant improvement is optical loss reduction.

The use of silicon nitride as the silicon rib cladding material has two additional desirable effects. First, it can be deposited as a low-stress thin film that helps to minimize polarization mode dispersion for light propagating in the rib waveguide. Second, silicon nitride is not significantly etched by hydrofluoric acid (HF), which is commonly used to remove the sacrificial silicon oxide layers during fabrication of micro-optical systems and other microelectromechanical systems (MEMS) to which a silicon waveguide may be combined. Because silicon nitride is not significantly etched by HF and has an intermediate index of refraction between that of silicon (n32 3.5) and that of air (n=1), silicon nitride (n=2) can also be used as an anti-reflection material. Therefore, silicon nitride can be used to coat places, such as, the facets of a gap, in an integrated process to fabricate multi-functional micro-optomechanical devices.

The use of silicon nitride as the silicon rib waveguide cladding layer instead of silicon dioxide or thermal oxide cladding layer has three benefits. First, low-stress silicon nitride is available and is used in the preferred embodiment of this application. The use of a low-stress nitride will reduce the amount of stress the cladding layer will cause on the waveguide. If significant stress is applied to a waveguide, the transverse electric (TE) and transverse magnetic (TM) polarization modes travel at different velocities, leading to polarization dependent dispersion and further optical loss. Thus, use of a low-stress silicon nitride cladding layer in the exemplary embodiment of this application minimizes the stress transmitted to the silicon rib waveguide. Second, for the integration of microelectromechanical system (MEMS) devices with waveguides, the waveguide cladding layer must be compatible with the release etching process of the MEMS components. Typically, a sacrificial silicon dioxide or thermal oxide layer is used that is etched away in a post processing step. If a thermal oxide or silicon dioxide is used for the waveguide cladding material, it would be removed during the etch of the sacrificial layer to release the MEMS components. Third, with the correct thickness of the silicon nitride layer, it may be used also as an anti-reflection coating. It has been determined that the silicon nitride cladding layer thickness should be a multiple of the light wave length ($\lambda$) divided by 4 times the index of refraction (n) of the cladding material; thus, the nitride cladding layer thickness is a multiple of $\lambda/4n$. For $\lambda=1.55$ $\mu$m and n=2 (nitride), this thickness is a multiple of 0.19 $\mu$m. In the exemplary embodiment of this application, the second silicon nitride layer 38 has a thickness of 0.19 $\mu$m. An anti-reflection coating can reduce optical losses at facets, such as at input and output surfaces and gaps in switches, by decreasing or eliminating the Fresnel reflections. For instance, the Fresnel reflections at an air/silicon interface, where the index of refraction for air is n=1 and for silicon is n=3.5, can cause a 1.5 dB loss, if no anti-reflection coating is applied to the facet.

Although the foregoing description illustrates the preferred embodiment, other variations are possible and all such variations as will be apparent to those skilled in the art are intended to be included within the scope of this application as defined by the following claims.

What is claimed is:

1. A method of fabricating a silicon-rib waveguide for a micro-optical device, comprising the steps of:
    providing a silicon-on-insulator structure having a single crystal silicon wafer surface thereof being bonded to a surface of a silicon wafer with a layer of insulative bonding material;
    patterning a surface of the single crystal silicon wafer opposite said surface bonded to the surface of the silicon wafer to form at least one silicon rib waveguide, the at least one silicon rib waveguide having a top surface and opposing side walls and end walls;
    forming a silicon nitride cladding layer on said top surface and said opposing side walls and end walls of the at least one silicon rib, said silicon nitride cladding layer having a predetermined thickness; and
    determining said predetermined thickness of said silicon nitride cladding layer for the combined use thereof as an anti-reflection coating and as an optical loss reducing layer, said predetermined thickness suitable for such combined use being based upon a multiple of the light wave length ($\lambda$) of a light transmitted through said silicon rib waveguide divided by four times the index of refraction (n) of the silicon nitride cladding layer ($\lambda/4n$).

2. The method of fabricating a silicon rib waveguide as claimed in claim 1, wherein the light wave length ($\lambda$) is about 1.55 and the index of refraction (n) of the silicon nitride cladding layer is about 2, so that the thickness of the silicon nitride layer is about 0.19 $\mu$m or multiples thereof.

3. The method of fabricating a silicon rib waveguide as claimed in claim 1, wherein said patterning of the surface of said single crystal silicon wafer further comprises the step of: patterning concurrently a parallel trench on each side of the opposing side walls of said silicon rib waveguide, so that each of said opposing side walls of the silicon rib waveguide is a respective wall of one of the trenches; and wherein the step of forming a silicon nitride cladding layer further includes forming a silicon nitride cladding layer on said trenches.

4. The method of fabricating a silicon rib waveguide as claimed in claim 3, wherein the step of patterning comprises the steps of;
    depositing an etch resistant material on the surface of the single crystal silicon wafer;
    patterning the etch resistant material to form a mask having vias therein to expose the surface of the single crystal silicon wafer, said vias having a dimension and location for said trenches; and etching the exposed surface of the single crystal silicon wafer through said vias in the mask using a Reactive Ion Etching (RIE) process.

5. The method of fabricating a silicon rib waveguide as claimed in claim 4, wherein the RIE etching process forms said silicon rib waveguide between said trenches; and wherein said opposing side walls and end walls of the silicon rib waveguide produced by said RIE etching process have a roughness of 1–500 nm; and wherein the silicon nitride cladding layer reduces the optical loss of the light propagating through said waveguide by about 0.35 dB/cm.

6. The method of fabricating a silicon rib waveguide as claimed in claim 5, wherein the trenches have a predetermined depth and the waveguide opposing side walls and end walls have a height about equal to the depth of said trenches.

7. The method of fabricating a silicon rib waveguide as claimed in claim 6, wherein the depth of the trenches and the height of the silicon rib waveguide opposing side walls and end walls is about 2 $\mu$m.

8. The method of fabricating a silicon rib waveguide as claimed in claim 1, wherein the silicon nitride cladding layer is the type having a low film stress to minimize strain on the waveguide, thereby preventing polarization mode dispersion of the light propagating therethrough.

9. A silicon rib waveguide for a micro-optical device, comprising:

a silicon rib waveguide as fabricated by the method of claim 1, said silicon rib waveguide having a silicon nitride cladding layer with a specific thickness to reduce optical loss of the light propagating therethrough and to provide an effective anti-reflection coating at said end walls that serve as facets to reduce optical loss from Fresnel reflections.

10. A silicon rib waveguide for a micro-optical device, comprising:

a silicon-on-insulator structure having a single crystal silicon substrate with opposing surfaces, one of said single silicon substrate surfaces being bonded to a silicon wafer by a layer of insulative bonding material;

a rib waveguide formed in the surface of the single crystal silicon substrate opposite the one bonded to the silicon wafer by a Reactive Ion Etching (RIE) process, said rib waveguide having opposing side walls and opposing end walls that serve as facets, said rib waveguide being bounded by a pair of parallel trenches, one trench on each side of the rib waveguide, so that one side wall of each of the trenches is also a respective one of the opposing side walls of the rib waveguide, said rib waveguide side walls and end walls formed by the RIE etching process having a surface roughness; and a silicon nitride cladding layer deposited on the surfaces of the rib waveguide and trenches, the silicon nitride cladding layer being of the type having a low film stress to minimize strain on said rib waveguide and having a predetermined thickness based upon a multiple of the light wave length ($\lambda$) of a light transmitted through said rib waveguide divided by four times the index of refraction (n) of the silicon nitride cladding layer ($\lambda/4n$), so that said silicon nitride cladding layer may be suitable for the combined use thereof to reduce the optical loss caused by the roughness of the rib waveguide rib side walls and to provide an anti-reflection coating at said end walls that serve as facets to reduce optical loss from Fresnel reflections.

* * * * *